Figure 1:
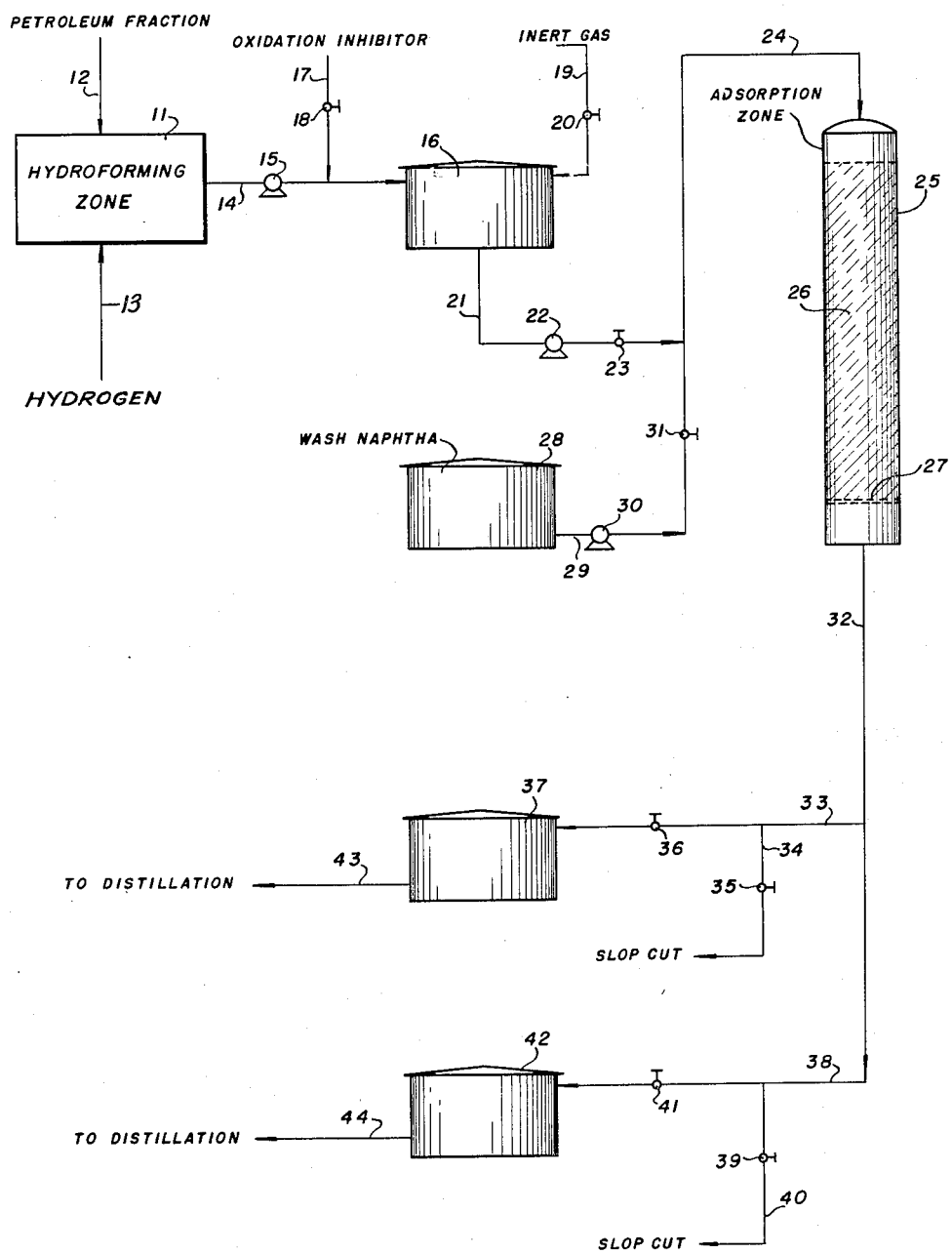

INVENTORS.
ALBERT T. WATSON,
HENRY G. SCHUTZE,
GEORGE F. ASSELIN,
BY
AGENT.

United States Patent Office 2,728,716
Patented Dec. 27, 1955

2,728,716

ADSORPTION PROCESS

Albert T. Watson, Henry G. Schutze, and George F. Asselin, Baytown, Tex., assignors, by mesne assignments, to Esso Research and Engineering Company, Elizabeth, N. J., a corporation of Delaware Application March 28, 1952, Serial No. 279,118

13 Claims. (Cl. 196—147)

The present invention is directed to an adsorption process in which a hydrocarbon is contacted with a porous adsorbent. More particularly, the invention is directed to an absorption process in which a thermally converted hydrocarbon is subjected to contact with a porous adsorbent, such as silica gel. In its more specific aspects, the invention is directed to a method for prolonging the life of a bed of porous adsorbent, such as silica gel, in a cyclic adsorption process in which the bed of porous adsorbent is contacted alternately with first and second feed hydrocarbons.

The present invention may be briefly described as involving an adsorption process in which a bed of silica gel is contacted with a petroleum fraction from a thermal conversion operation in which the converted fraction has excluded from it prior to contact with said silica gel and oxygen which may be contained in or in contact with the converted naphtha.

The invention is particularly directed to a method for prolonging the life of a bed of porous adsorbent, such as silica gel in a cyclic adsorption process in which the bed of silica gel is alternately contacted with a petroleum fraction from a thermal conversion operation and with a hydrocarbon which has not been subjected to a conversion operation, such as a hydrocarbon from crude petroleum. In this process, our contribution is the excluding of oxygen from the converted hydrocarbon prior to contacting same with the bed of porous adsorbent, such as silica gel. By excluding oxygen from the converted hydrocarbon, it is possible to prolong the life of silica gel to a remarkable extent.

In our invention the oxygen may be excluded from contact with the converted hydrocarbon by blanketing the converted hydrocarbon with an inert gas, such as methane, ethane, nitrogen and other inert gases, such as argon, krypton, xenon, and helium, as well as neon, but the latter rare gases will not be economically desirable for employment because of their expensive nature. Gases such as methane and ethane may also be used and may be preferred because of their availability. By inert gas as used in the specification and claims we mean any gas which contains no free oxygen and which is substantially unreactive with the converted hydrocarbon.

It is also possible to exclude oxygen from the converted naphtha by adding an oxidation inhibitor to the converted naphtha prior to contact with free oxygen such that any oxygen that comes in contact with the converted naphtha is consumed by the oxidation inhibitor. Such oxidation inhibitors are well known but may be exemplified by tertiary butyl catechol, phenolic bodies derived from petroleum, hydroquinone, hydroxy benzoic acids, isobutyl-para-amino phenol, and the p-phenylene diamines. A particularly desirable type of inhibitor is a fraction of petroleum phenols obtained by extracting heavy cracked distillates boiling in the range from about 250° to 700° F. with a 30° to 50° Baumé sodium hydroxide solution and acidifying the resulting extract to release the phenols. The oxidation inhibitor, and particularly the phenols, may be used in an amount ranging from about 1.5 pounds up to about 20 pounds per 1000 barrels of the converted naphtha.

By thermally converted naphtha, as employed in the specification and in the appended claims, we mean any naphtha or hydrocarbon fraction which is subjected to cracking, hydroforming, cyclization or other thermal treatment with or without catalyst.

The porous adsorbent employed in the practice of the present invention will preferably be silica gel but may be other types of porous adsorbents, such as activated alumina or adsorbents having adsorptive characteristics similar to silica gel, such as activated carbon, such as exemplified by coconut charcoal, in that one hydrocarbon in a mixture of hydrocarbons of dissimilar types is adsorbed preferentially. The porous adsorbent is preferably silica gel having a mesh size from about 14 to about 250 mesh although silica gel having mesh sizes up to as high as 350 mesh may suitably be used. Silica gel is a well known article of commerce and further description thereof is not deemed necessary.

The activated carbon may be an activated char or carbon, such as is available in the industry and may be produced from a large variety of substances, such as bagasse, corn cobs, other farm products, cereals, blood, kelp, petroleum sludges, acid petroleum residue, coconuts, fruit pits, and many other sources too numerous to mention here. It is to be understood that the activated carbon to be employed in our invention must be suitably activated as understood in the industry. There are many methods for preparing activated carbon and we intend to employ an activated carbon or charcoal within the meaning of the terminology known to the industry. When activated carbon or charcoal is employed in our process, it may have a mesh size in the range given for silica gel.

Activated alumina may also be used as a porous adsorbent in making such separation and we contemplate that activated alumina may also be used. The terminology "activated alumina" is well understood and further description thereof is not deemed necessary. The activated alumina will also have mesh sizes comparable to that recited for the silica gel.

The invention contemplates employing converted hydrocarbon fractions and while it is particularly directed to converted naphthas, it is not to be limited thereto since higher boiling converted fractions may be suitably treated in accordance with our invention. When converted naphthas are produced they suitably boil in the range from about 200° to about 450° F. Distillate fractions which have been converted boiling up to as high as 750° F. may be used.

When the invention is used in a cyclic adsorption process, the hydrocarbon solvent which is alternately contacted with the bed of porous adsorbent will have a boiling range different from the boiling range of the converted naphtha. For example, when the converted naphtha boils in the range from about 200° to about 350° F., it will be desirable to use a hydrocarbon solvent having a boiling range different from that of the converted naphtha. For example, when employing a converted naphtha boiling in the range from about 200° to about 350° F., a hydrocarbon solvent, such as a hexane fraction containing benzene, may be used. This hexane fraction may contain paraffins, naphthenes and a small amount of benzene say, for example, 5% to 10% by volume although we do not restrict ourselves to such benzene content.

In practicing our invention in a cyclic process, it is possible to prolong the life of the bed of porous adsorbent way beyond that possible when otherwise a converted naphtha is one of the feed stocks and oxygen is not excluded. Besides it is possible to recover desirable hydrocarbons both from the converted naphtha and from the hydrocarbon solvent. It is thus contemplated that our invention may be employed in a cyclic process in which a bed of porous adsorbent, such as silica gel is alternately contacted with feeds containing hydrocarbons of the same type but of different boiling points. For example, one feed may contain aromatics, naphthenes and paraffins of similar boiling points and the other feed may contain aromatics, paraffins and naphthenes also having similar boiling points but different from the boiling points of the first feed. For example, the boiling points of the hydrocarbons in the second feed may be either higher or lower than the boiling points of the hydrocarbons of the first feed. It is essential, however, that the boiling points of the hydrocarbons in the second feed be different from the boiling points of the hydrocarbons in the first feed.

While it is desirable that the second hydrocarbon, which may be termed a wash hydrocarbon or hydrocarbon solvent, be an unconverted hydrocarbon fraction, it is within the purview of our invention to employ in a cyclic operation two converted hydrocarbons of the type illustrated. For example, one converted hydrocarbon would be alternately fed to a bed of porous adsorbent with the second converted hydrocarbon. In these instances, both of the converted hydrocarbons would have oxygen excluded therefrom by adding an inhibitor to the converted hydrocarbons and/or gas blanketing of same. In such operations, it is understood, of course, that one converted hydrocarbon would have a boiling range different from that of the other converted hydrocarbon. For example, one converted hydrocarbon may boil from 200° to 275° F. and the other may boil from say 300° to 400° F.

Ordinarily the second feed or the hydrocarbon solvent or wash hydrocarbon will be an unconverted hydrocarbon fraction such as a fraction of crude petroleum. As mentioned before, the second feed must contain hydrocarbons having boiling points different from the hydrocarbons in the first feed or the converted hydrocarbon. Examples of the unconverted hydrocarbon feed may include pentane-containing fractions, hexane-containing fractions, fractions boiling in the range from 100° to 175° F. and fractions higher boiling than the converted fraction which is to contact, alternately with the wash hydrocarbon, the bed of silica gel or porous adsorbent.

Figure 2:
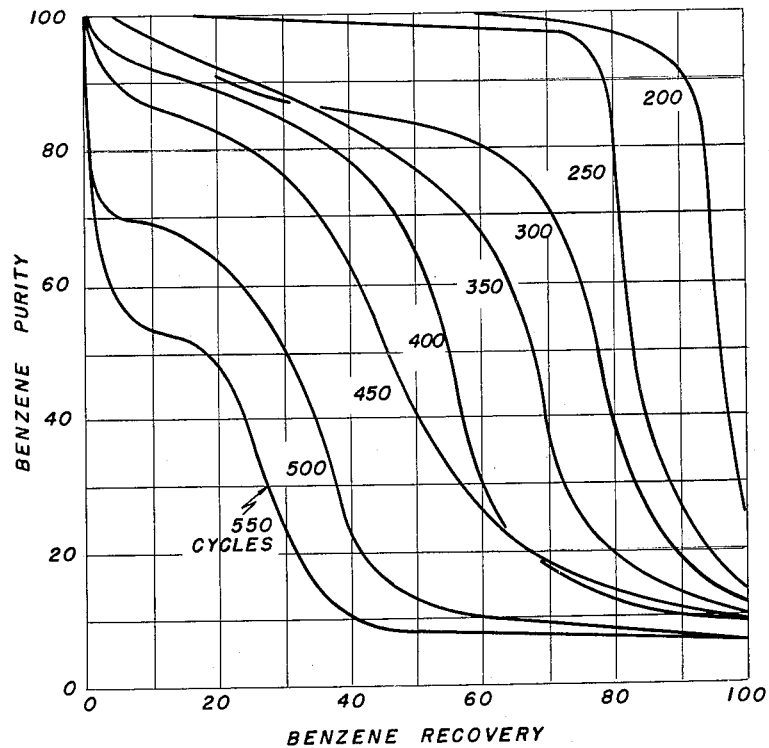
Figure 3:
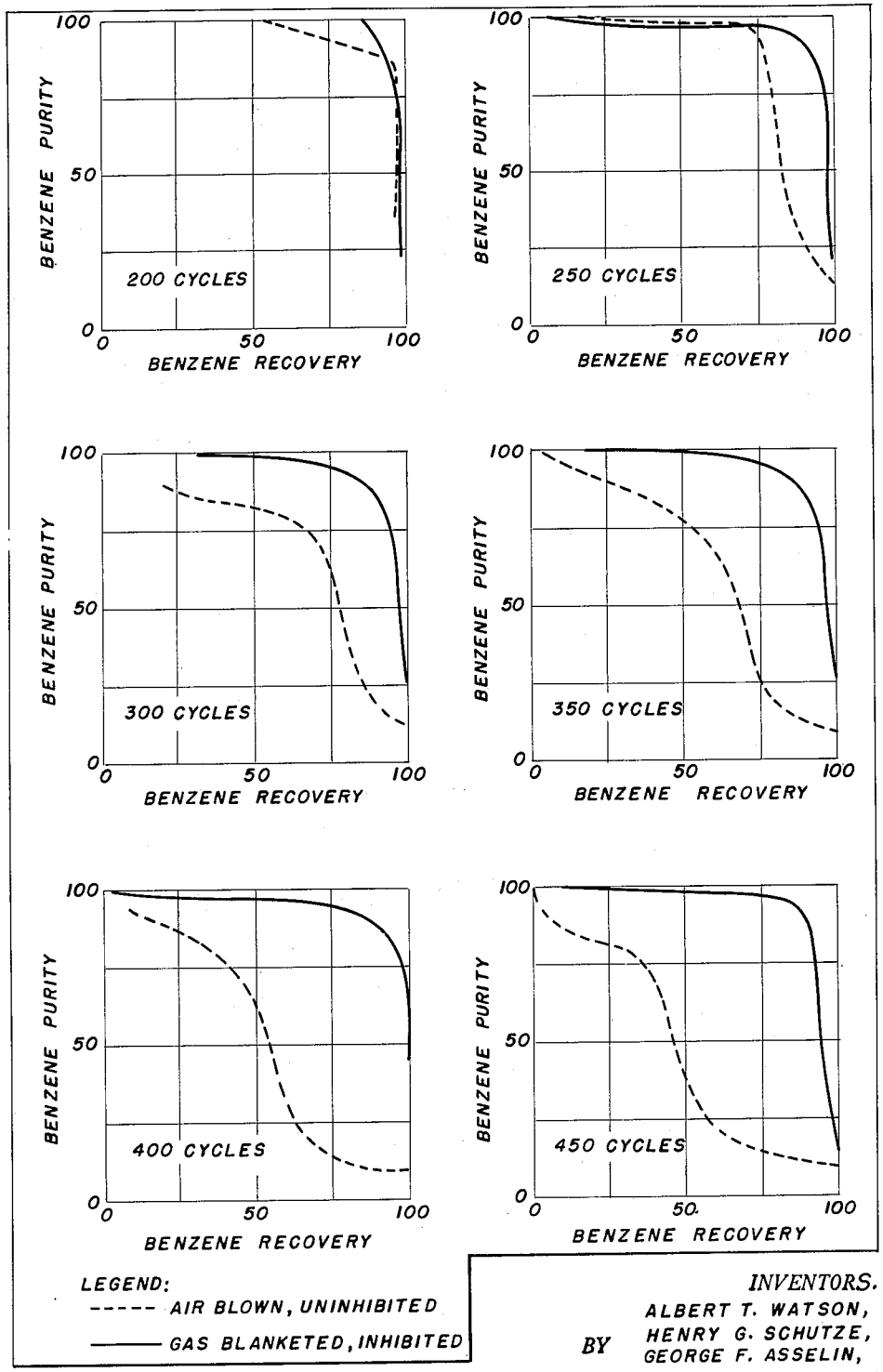
Figure 4:
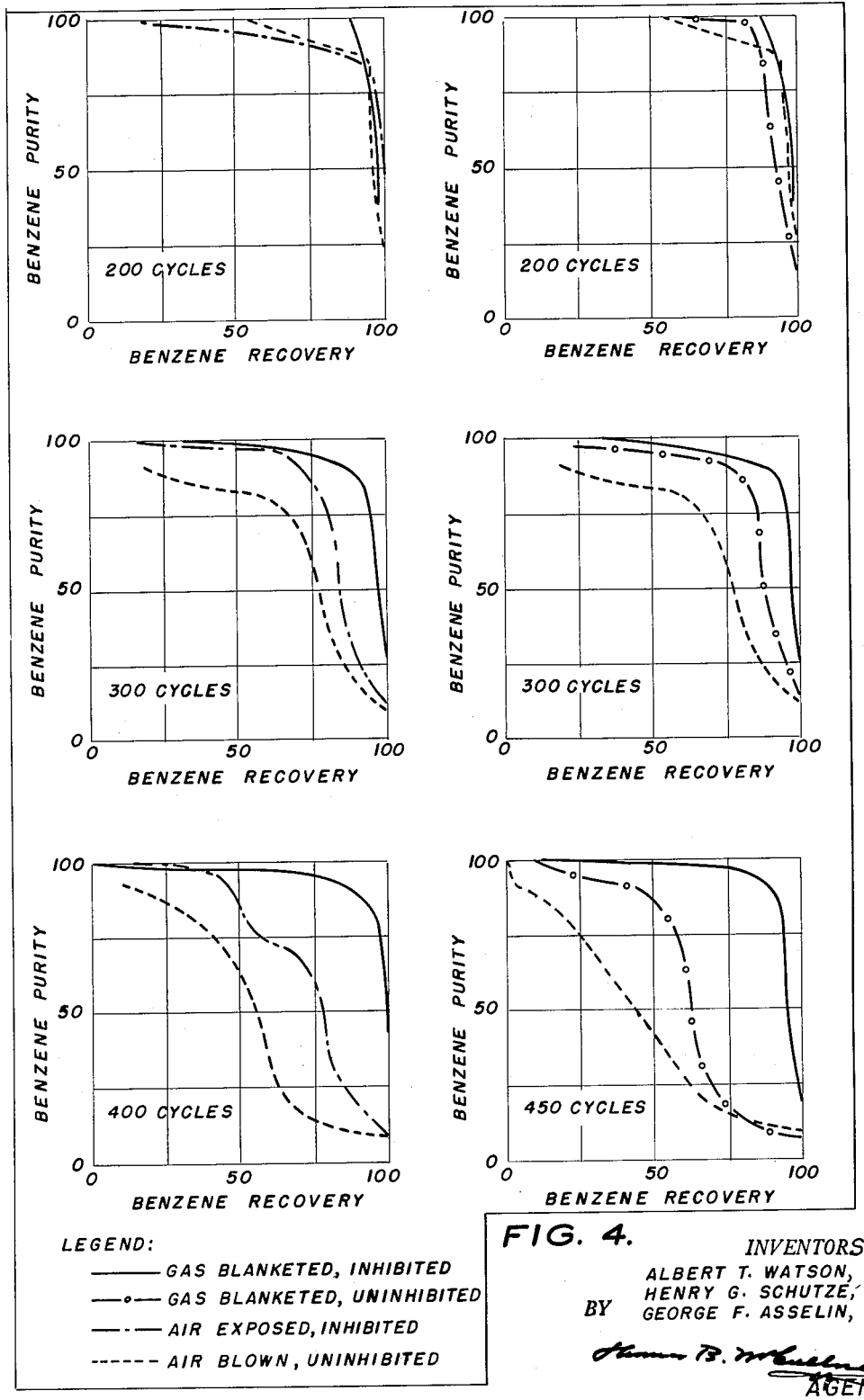

The present invention will be further described by reference to the drawing in which Fig. 1 is a flow diagram of a preferred mode of practicing the invention;

Fig. 2 is a chart illustrating the deactivation of a bed of silica gel in a cyclic process in which the present invention was not practiced;

Fig. 3 includes a series of charts for varying long cycles showing the improvement of the present invention; and Fig. 4 is a similar chart to that of Fig. 3.

Referring now to the drawing and particularly to Fig. 1, numeral 11 designates a thermal or catalytic conversion zone, such as a hydroforming zone, which may be either of the fixed bed or fluidized type. Zone 11 may be any type of conversion zone. Hydroforming operations are well known but will be described in some detail here. It should suffice to say that the hydroforming operations may be conducted in the presence of a catalyst, such as oxides of chromium, tungsten or molybdenum or sulfides of these metals. The oxides or sulfides of the metals of group VI of the Periodic Table, 1947 Edition, W. M. Welsh Manufacturing Company, Chicago, U. S. A., may be used as such as a catalyst but preferably will be employed as a supported catalyst; for example, a suitable supported catalyst is molybdenum oxide on alumina. Other suitable supports which may be used include zirconia, silica, magnesia and spinel types of supports and mixtures thereof. The hydroforming operation may be conducted at temperatures within the range from about 800° to about 1150° F. and preferably in the range from about 850° to 1000° F. Pressures employed may range from 50 to 500 pounds per square inch with a preferred pressure from 75 to 200 pounds per square inch in the hydroforming operation. Such hydroforming, as conducted in zone 11, is conducted in the presence of extraneously added hydrogen and it may be desirable in our invention to employ a hydroforming operation in which hydrogen in an amount from about 50 to about 2000 cubic feet per barrel of feed is used. Good results are obtained when amounts of hydrogen from about 1000 to about 2000 cubic feet per barrel are employed.

It is understood that hydroforming zone 11 will include all auxiliary equipment usually found associated with such hydroforming operations and may include distillation towers, furnaces and means for separating gases and liquids.

In any event, there is charged to hydroforming zone 11 a petroleum fraction, such as one boiling in the range from 200° to 450° F. through line 12 to cause conversion of naphthenes to aromatics. During such conversion operations in zone 11 there may be formed a small amount of olefins and other reactive materials. Hydroforming zone 11 is also provided with line 13 through which hydrogen is introduced.

The product from hydroforming zone 11 is withdrawn therefrom by line 14 containing pump 15 and is discharged thereby into a storage tank 16. Prior to entry into tank 16, there is added to the hydroformed naphtha in line 14 a suitable amount of an oxidation inhibitor of the type illustrated, by line 17 controlled by valve 18. The hydroformed or converted naphtha in tank 16 ordinarily is exposed to the presence of oxygen contained in a space above the converted naphtha since it is impossible to fill such tanks completely full unless some displacing means is employed. Also oxygen may be introduced into a substantially closed system through pumps and other prime movers. In accordance with our invention, we, therefore, add to the upper portion of tank 16 an inert gas of the type illustrated, by line 19 controlled by valve 20, to prevent the inhibited naphtha from coming into contact with any oxygen.

Thereafter the inhibited and gas blanketed converted naphtha may be withdrawn from tank 16 as required by line 21 containing pump 22 and valve 23 and routed through line 24 into an adsorption zone 25 which contains a bed of a porous adsorbent 26. For purposes of this illustration, silica gel may be arranged on a grid plate or supporting means 27. The converted naphtha flows downwardly through bed 26 of silica gel and by virtue of such flow the aromatic hydrocarbons contained therein resulting from the operations in hydroforming zone 11 are selectively adsorbed on the silica gel while the non-aromatic hydrocarbons tend to accumulate in the lower portion of bed 26. For example, if it is assumed that the hydroformed product in tank 16 contains xylenes which it is desired to recover and non-aromatics, such as those having 9 carbon atoms, the xylenes will be preferentially adsorbed on the silica gel and the non-aromatics accumulated in the lower portion of the bed. After the hydroformed product or converted naphtha has been flowed to zone 25 for a time sufficient to fill completely the bed with adsorbed and unadsorbed material, the flow from tank 16 is interrupted by shutting down pump 22 and closing valve 32. Thereafter a naphtha, such as a hexane fraction containing benzene, naphthenes and paraffins may be introduced into the system from tank 28 by line 29 containing pump 30. Line 29 also contains a valve 31 and connects into line 24. Thus the naphtha containing benzene is introduced through line 24 into adsorption zone 25 and flows downwardly therein resulting in the selective or preferential adsorption of the benzene and the desorption of the xylenes which were adsorbed on the silica gel. As a result there is displaced from the bed 26 a mixture of benzene and some xylene and non-aromatic hydrocarbons which are withdrawn by line 32, line 33 and branch line 34 controlled by valve 35. This slop cut may be further treated or reprocessed as may be desired. Once the slop cut is withdrawn by line 34, valve 35 is closed and valve 36 in line 33 is opened allowing the displaced xylenes and the saturates from the naphtha in tank 28, since they are not adsorbed, to be accumulated in tank 37. Once the bed 26 has adsorbed its capacity for benzene, flow from tank 28 is interrupted by closing valve 31 and stopping pump 30 and flow is resumed from tank 16 by opening valve 23 and starting up pump 22. This results in the effluent from adsorption zone 25 flowing outwardly therefrom by line 32 and into line 38, valves 35 and 36 being closed. Thus there is withdrawn by opening valve 39 in line 40 a slop cut of benzene, some xylenes and paraffins since the xylenes in the product in tank 16 are preferentially adsorbed on the bed 26 and the benzene contained therein desorbed. After the slop cut is withdrawn by line 40 valve 39 is closed and valve 41 in line 38 is opened allowing the fraction consisting essentially of benzene $C_9$ non-aromatics and xylenes to be accumulated; benzenes, xylenes and heavy $C_9$ saturates are accumulated in tank 42. Thereafter the product in tank 37 and in tank 42 may be suitably distilled by routing them, respectively, by lines 43 and 44 to distillation facilities, not shown, wherein the xylenes may be recovered from the light saturates and the benzenes may be recovered from the xylenes and heavier saturates.

In an operation in accordance with the description taken as shown with respect to the drawing, it has been possible to operate over long periods of time obtaining high yields of benzene which was impossible prior to our invention. For example, a number of runs was made in which a hydroformed product containing xylenes and some $C_9$ and $C_{10}$ aromatics and $C_9$, $C_{10}$ and $C_{11}$ non-aromatic hydrocarbons was contacted with a bed of silica gel, the flow interrupted and then the bed of silica gel was contacted with a hexane fraction containing benzene. This operation was conducted over a period ranging from 200 to 550 cycles principally for the recovery of benzene from the hexane fraction. The data obtained from said runs were plotted as benzene purity for cycles ranging from 200, 250, 300, 350, 400, 450, 500 and 550 cycles against the percentage of benzene recovered. These data are presented in Fig. 2. In all cases, in the runs conducted in accordance with the foregoing operation, as illustrated by the data in Fig. 2, oxygen was not excluded from the hydroformed product. Examination of the data in Fig. 2 shows that 100 per cent purity of benzene was achieved at 200 cycles with 60% recovery but that the purity and recovery then dropped off. After 250 cycles a purity of 100% with 20% recovery was obtained and then the purity slowly dropped off to about 80% and thereafter sharply declined. With 300 cycles the operation was seriously impaired as shown by the series of curves. It will be clear that in the practice of the prior art the life of the bed was such that only about 250 cycles could be used and, thereafter, the recovery and purity of the benzene had deteriorated to a marked extent.

A series of runs were conducted at various length cycles in which the same hydroformed product as that employed in obtaining the data in Fig. 2 was blown with air and compared with a portion of the same hydroformed product which was inhibited with a petroleum phenol fraction in the amount of 7 pounds per 1000 barrels of the hydroformed product; in other instances the hydroformed product was gas blanketed with natural gas, consisting principally of methane. In some of the runs shown in Figs. 3 and 4 the hydroformed product was both gas blanketed and inhibited. In all of these runs a hexane fraction containing benzene was employed from which benzene was recovered in the life study of the silica gel.

It will be apparent from an examination of the data as shown in Figs. 3 and 4 that gas blanketing and inhibiting of the hydroformed product results in a marked improvement in extending the life of the bed of silica gel and allowing high recoveries of benzene. For example, referring to Fig. 3, after 400 cycles it was possible to obtain 80% recovery of benzene of 94% purity, whereas operating without gas blanketing and without inhibiting resulted in 80% recovery of benzene of only 12% purity. Similar results were obtained at 450 cycles and in this case 80% recovery of benzene of 96% purity was obtained after 450 cycles against 80% recovery of benzene of about 13% purity for the prior art.

Referring to Fig. 4 it will be seen that gas blanketing without inhibiting gives a marked improvement over the prior art process where oxygen was not excluded and inhibiting alone also gives an improved result over the prior art practice.

The present invention may be practiced with adsorption operations conducted at temperatures ranging from about 32° F. up to about 120° F. Preferred temperatures will be from about 60° F. up to 100° F. Temperatures above and below these values are operable, the lower limit being defined primarily by the need of adequate fluidity and the upper limit by the pressure required to maintain a liquid phase and by the effect of temperature increases toward decreasing the inherent adsorptive capacity and selectivity of the adsorbent.

It is desirable that the silica gel be arranged in a bed and the hydrocarbon feeds may be flowed therethrough either up or downflow with downflow preferred. The bed of porous adsorbent, such as silica gel, may be used in amounts sufficient to provide a volume ratio of adsorbent to the feed hydrocarbons such as the converted hydrocarbon, and the petroleum fraction or hydrocarbon fraction as they may be termed in a ratio in the range from 0.3:1 to about 14:1.

The time which the converted hydrocarbon and the other hydrocarbon will be in contact with the porous adsorbent may range from about 15 minutes to as much as 2 hours or more. The time for flowing one of the hydrocarbons, such as the hydroformed or converted hydrocarbon, to the bed may be substantially the same as the time for flowing the wash naphtha or second hydrocarbon through the bed depending, of course, on the relative concentrations in the two fractions of the hydrocarbon which it is desired to adsorb on the porous adsorbent.

The beds of porous adsorbent may be provided with suitable length to diameter ratios to give best results. The beds may be elongated beds having a length to diameter ratio in the range from 1:1 to 200:1. Very good results have been obtained with beds having ratios of length to diameter of 24:1. In fact, such beds were used in the several examples.

The nature and objects of the present invention having been completely described and illustrated, what we wish to claim as new and useful and to secure by Letters Patent is:

1. In a continuous cyclic method for separating adsorbable hydrocarbons from a thermally converted naphtha which has been contained in a system exposed to oxygen, by contact with a porous adsorbent selected from the group consisting of silica gel, activated carbon, and activated alumina which comprises contacting said adsorbent with said naphtha to adsorb at least one adsorbable hydrocarbon component of said naphtha, thereafter contacting said porous adsorbent containing said adsorbed hydrocarbon component with a hydrocarbon solvent to desorb said adsorbed hydrocarbon component and to reactivate said porous adsorbent for adsorption of additional amounts of said hydrocarbon component, and then immediately resuming the cycle by contacting said porous adsorbent with said naphtha, the improvement which comprises excluding oxygen from said naphtha for the entire time prior to contacting.

2. A method in accordance with claim 1 in which the thermally converted naphtha is a hydroformed naphtha.

3. A method in accordance with claim 1 in which the porous adsorbent is arranged in a bed in an adsorption zone.

4. A method in accordance with claim 1 in which the oxygen is excluded by adding a phenolic oxidation inhibitor to the thermally converted naphtha in an amount in the range from about 1.5 to about 20 pounds per thousand barrels of said thermally converted naphtha and by blanketing the thermally converted naphtha containing said inhibitor with methane.

5. A method in accordance with claim 1 in which the hydrocarbon solvent is a saturated hydrocarbon.

6. A method in accordance with claim 1 in which the hydrocarbon solvent is a hydrocarbon fraction containing aromatic hydrocarbons.

7. A method in accordance with claim 1 in which the hydrocarbon solvent is a petroleum fraction containing aromatic hydrocarbons having a boiling range different from the boiling range of the converted naphtha.

8. A method in accordance with claim 1 in which the oxygen is excluded by adding an oxidation inhibitor to the converted naphtha and blanketing the inhibited converted naphtha with an inert gas.

9. A method in accordance with claim 8 in which the oxidation inhibitor is a phenol and the inert gas is methane.

10. A method in accordance with claim 1 in which the oxygen is excluded by adding an oxidation inhibitor to said converted naphtha.

11. A method in accordance with claim 10 in which the oxidation inhibitor is a phenolic oxidation inhibitor.

12. A method in accordance with claim 1 in which the oxygen is excluded by blanketing said converted naphtha with an inert gas which is substantially unreactive with the converted naphtha.

13. A method in accordance with claim 12 in which the inert gas comprises methane.

References Cited in the file of this patent
UNITED STATES PATENTS

| | | |
|---|---|---|
| 2,029,748 | Weber | Feb. 4, 1936 |
| 2,180,372 | Shoemaker | Nov. 21, 1939 |
| 2,349,473 | Tannich | May 23, 1944 |
| 2,402,425 | Meier | June 18, 1946 |
| 2,470,339 | Clausen et al. | May 17, 1949 |
| 2,509,486 | Danforth | May 20, 1950 |
| 2,526,499 | Paulsen | Oct. 17, 1950 |

OTHER REFERENCES

"Petroleum Processing," vol. 6, No. 8, August 1951, pp. 833–835 (article by Guthrie)..